Figure 1:
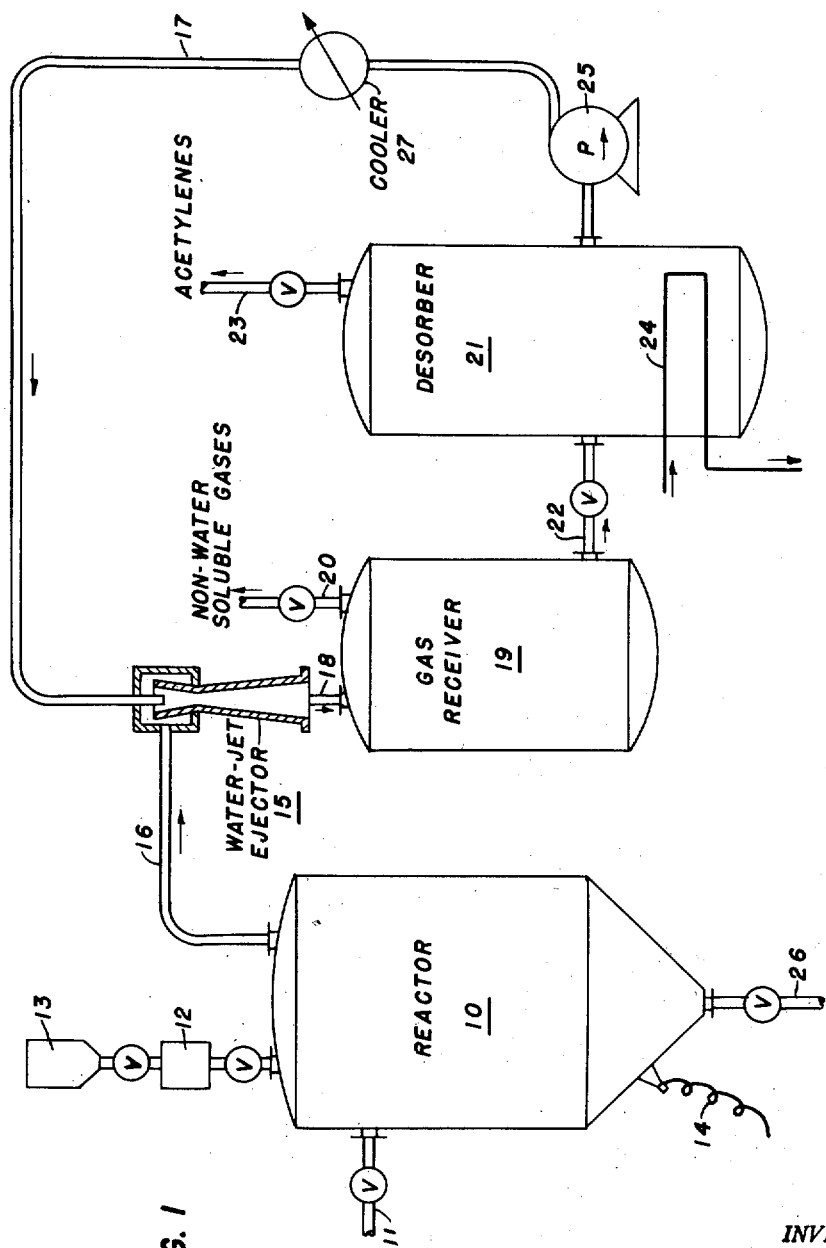

INVENTORS.
LEROI E. HUTCHINGS
EDMUND D. BLUM
BY
ATTORNEY.

United States Patent Office 2,790,759
Patented Apr. 30, 1957

2,790,759
PROCESS FOR THE PRODUCTION OF ACETYLENES

Le Roi E. Hutchings, Crystal Lake, and Edmund D. Blum, Elgin, Ill., assignors to The Pure Oil Company, Chicago, Ill., a corporation of Ohio Application December 28, 1953, Serial No. 400,684

4 Claims. (Cl. 204—171)

This invention relates to the production of acetylene by means of an electric arc process. It specifically relates to improving the efficiency of electric arc processes which produce acetylenes from liquid hydrocarbons.

Because of the reactivity of the acetylene, this hydrocarbon is one of the most versatile of the organic materials used in the manufacture of derivatives. The first production of acetylene was used for illuminating purposes. Thereafter, with the development of oxy-acetylene metal working processes, acetylene became more important as a consumer product and the investigation of various processes for the manufacture of acetylene began in earnest. Although some of the early produced acetylene was consumed in the chemical synthesis field, it was not until World War II that the great potentialities of acetylene were recognized. Accordingly, the greater proportion of the amounts of acetylene now made is used as a basic raw material employed in the production of a wide variety of consumer goods. A number of methods have been developed for the manufacture of acetylene. The first commercial production of acetylene was by means of the "timed-honored" Carbide process. However, processes employing petroleum and natural gases, because of the general availability of these certain materials, are now being used commercially to provide competition for the Carbide process. Substantially all of these processes employ natural gas as the feed stock, e. g., the Schoch Electric Arc process, partial oxidation with oxygen, partial oxidation with air, and the Wulff Regenerative Furnace process. Unfortunately, the gases produced in these processes are very low in acetylene content. This disadvantage requires that a considerable part of the capital investment of an acetylene from natural gas plant be expended in a gas purification system. There is, however, available a process which employs liquid petroleum hydrocarbons such as residual stocks or heavy catalytic cycle fraction to produce a gaseous reaction product containing substantial amounts of the acetylenes. This method, which will hereinafter be referred to as the Ediger process, is described in United States Patent No. 2,632,731. Like the Carbide method, the Ediger process requires large quantities of economically obtained electric power. It is, therefore, desirable from an economic standpoint to operate this process as efficiently as possible.

Accordingly, it is the primary object of this invention to enhance the efficiency of an electric arc process for producing acetylene by means of the Ediger process. This and other objects will become apparent from the following detailed discussion of the instant invention.

The included drawing is a schematic flow diagram of an apparatus for producing acetylene by means of the process of this invention.

The Ediger process, which was originally developed for the production of acetylene from liquid hydrocarbons, involves a method in which a hydrocarbonaceous fluid is subjected to transient electric arcs generated between electricity conducting granules loosely placed in shallow layers and supported on a fixed electrode grid. These granules, which are, in effect, mobile electrodes, have freedom of movement above the supporting surface. This fixed electrode grid, which comprises electrically energized fixed electrodes separated from each other by insulating spacers, is submerged in a fluid bed which constitutes the charge stock. By means of this novel technique, transient arcs of very short duration are produced beneath the surface of the liquid feed stock which is maintained at a relatively low temperature. As a result, small reaction zones are formed in which extremely high temperatures and moderately elevated pressures are almost instantaneously produced. The reaction products produced under these conditions are rapidly quenched by the surrounding cooler liquid during that period when the arc is extinguished. The emerging gaseous reaction products dislodge the granules resting on the grid and disrupts the arcs while other granules reorientate their positions to re-contact one another to effectuate the repetition of arcing. In employing this technique, gaseous effluent containing 30 to 40 mol percent of acetylenes can be manufactured from a wide variety of liquid petroleum fractions. Approximately 40 to 50 percent by weight of the oil charged to the system is converted into acetylene with the remainder forming hydrogen, ethylene, and carbon black in proportions depending upon the nature of the charge and the operating conditions employed.

This process has heretofore been carried out at atmospheric pressure. It now has been found, according to this invention, that acetylene may be more efficiently produced by the Ediger process by conducting the method under sub-atmospheric pressures. Referring to the drawing, it is seen that a hydrocarbonaceous feed stock is introduced into reactor 10 by means of line 11. As has been pointed out above, this reactor comprises a fixed electrode bed comprising a plurality of electrodes, separated from each other by insulating spacers and maintained in a substantially horizontal position. A shallow bed of granules or mobile electrodes is superposed on the fixed electrode grid and held in place by a suitable retaining means surrounding the shallow bed of granules to avoid piling or drifting due to the migration of the granules. In order to restrain the excessive lateral displacement, a foraminous or perforate inclosure wall is disposed around the electrode grid. A suitable inclosure may be prepared from a wire screen having a mesh small enough to retain the granules on the electrode grid until they are reduced in size by erosion to such an extent as to make it advisable that they be removed from the reaction zone. Because the granules are in motion and in contact with one another, attrition occurs and reduces the granular size necessitating replenishment. It is, therefore, necessary to provide a means to effect this replenishment of the granules. This can be accomplished by means of a suitable hopper, such as 12, which is connected directly to the reactor. This hopper 12 may be isolated from the interior of the reactor by suitable valve means in order to permit the hopper to be charged with granules contained in bin 13. The granules then can be discharged into the reactor 10 without disrupting the pressure conditions within the reactor. Power is supplied to the fixed electrode bed through line 14. In accordance with this invention, reactor 10 is operated at subatmospheric pressures which may be produced by means of a vacuum pump or other suitable means. It is preferred, however, that a system using water ejector or fume absorber 15 which is shown in the schematic cross-section in the accompanying drawing be employed. Conduit 16 is used to carry the reaction effluent from reactor 10 to ejector 15. The motive fluid which operates the ejector, which in the preferred embodiment is water, enters the ejector from line 17. Accordingly, the gaseous reaction effluent is diffused within the aqueous motive fluid which also functions as an absorbent to produce a mixed fluid which leaves ejector 15 by means of line 18 and passes to gas receiver 19 which is maintained at super-atmospheric pressures. The non-water soluble gaseous products from the reaction mixture which are carried into gas receiver 19 by means of the aqueous motive fluid operating the ejector 15 are separated from the fluid mixture through line 20. The acetylenes being the only products of the reaction, which are preferentially soluble in water, remain in solution in the aqueous motive fluid. This water solution then passes to desorber 21 through conduit 22. This conduit is provided with a suitable pressure reducing device which permits desorber 21 to be operated at a lower pressure than gas receiver 19. This permits the acetylenes contained in the aqueous solution to be stripped from the aqueous absorbent. Although a sufficient pressure differential can be maintained between gas receiver 19 and desorber 21 to effect desorption of the acetylene without the application of heat from an external source, this would require an abnormal recycle rate. Therefore, it is preferred that desorption be facilitated by the addition of heat to the desorption system by means of a heater such as coil 24 which is supplied with heat by a suitable heat exchange fluid, such as steam, Dowtherm, etc. The stripped absorbent is withdrawn from desorber 21, cooled by means of cooler 27, and recycled through line 17 by means of circulating pump 25 for reuse as the motive liquid for ejector 15 and absorbent for acetylene contained in the entrained fluid entering ejector 15 as reaction effluent through line 17. Any carbon black which is formed during the reaction does not leave the reactor 10, and accumulations of this material in combination with the attrited granules may be removed from reactor 10 by means of line 26.

As an example of the effectiveness of the subject invention, a No. 1 furnace oil, which is a petroleum distillate, having an initial boiling point of about 360° F. and an end point of about 550° F., was fed to a reactor employing the electrode system used in the Ediger process described above. One run was conducted by atmospheric pressure, several other runs were conducted at sub-atmospheric pressures and finally a check run was conducted at atmospheric pressure. All runs were made with 416 volt alternating current. The results from these runs are compiled in Table I.

*Table I*

| Run No | 1 | 2 | 3 | 4 |
|---|---|---|---|---|
| Absolute Pressure, in. of Hg | 29.9 | 4.4-16.4 | 5.4-7.4 | 29.9 |
| Gas produced: | | | | |
| volume, cu. ft.[1]/kw.-hr | 8.54 | 9.14 | 9.05 | 8.53 |
| acetylenes, percent v | 27.6 | 30.3 | 33.0 | 27.8 |
| Efficiency, Kw.-hr./lb. acetylenes | 6.2 | 5.27 | 4.88 | 6.15 |

[1] At 70° F. and 1 atmosphere.

In carrying out the instant invention, a wide variety of petroleum products can be employed as feed stocks. However, inasmuch as the disposal of the heavier petroleum oils such as residuum, catalytically cracked cycle stock, and the like constitute a marketing problem, the subject process provides a means for disposing of these fluids by employing them as feed to the process. The electrical power employed to run the reactor may be obtained from any conventional alternating current source of supply. When employing a fifty cycle alternating current, voltages between about 300 and 6,000 are suitable although higher frequency alternating currents may be employed. Enhanced efficiency of operation effected by means of the instant invention occurs at sub-atmospheric pressures. As is seen from the data in Table I, the efficiency increases as the absolute pressure within the reactor becomes lower. It is, therefore preferred to employ a sub-atmospheric operating pressure as low as may be conveniently obtained within the reactor preferably 2-8 pounds per square inch absolute.

In the preferred embodiment shown in the drawing, an additional feature of this invention is illustrated. This distinctive feature involves the use of the water jet ejector which reduces the pressure by evacuation of the reaction effluent from the reactor, thereby simultaneously intimately mixing the gas with water and absorbing the acetylenes therefrom to accomplish the first step required for separation and purification of the reaction products. Although other pressure reducing means may be employed in carrying out this invention, the water jet ejector technique employed in the illustrated embodiment is preferred.

We therefore claim as our invention:

1. A process for producing acetylene which comprises subjecting a liquid hydrocarbonaceous feed in the liquid phase to transient electric arcs generated between electricity-conducting granules loosely placed in shallow layers and supported on a fixed electrode grid in a reaction zone to produce an acetylene and non-water soluble components-containing gaseous reaction effluent, withdrawing said effluent by means of a jet ejector employing water as the motive fluid whereby said reaction zone is maintained at a subatmospheric pressure of about 2-8 pounds per square inch absolute, contacting said effluent and said motive fluid within said ejector to produce a diffused fluid consisting of said effluent and said motive fluid, and passing said diffused fluid to a gas separator means wherein the non-water soluble components are separated from the diffused fluid to produce an aqueous solution of acetylene.

2. A process for producing acetylene which comprises subjecting a liquid hydrocarbonaceous feed in the liquid phase to transient electric arcs generated between electricity-conducting granules loosely placed in shallow layers and supported on a fixed electrode grid in a reaction zone to produce an acetylene and non-water soluble components-containing gaseous reaction effluent, withdrawing said effluent by means of a jet ejector employing water as the motive fluid whereby said reaction zone is maintained at a subatmospheric pressure of about 2-8 pounds per square inch absolute, contacting said effluent and said motive fluid within said ejector to produce a diffused fluid consisting of said effluent and said motive fluid, passing said diffused fluid to a gas separator means wherein the non-water soluble components are separated from the diffused fluid to produce an aqueous solution of acetylene, transferring said aqueous solution to a stripping zone wherein the acetylene in aqueous solution is recovered therefrom.

3. A process in accordance with claim 2 in which the stripping zone is maintained at a substantially lower pressure than said separator means.

4. In a liquid phase process for producing acetylene by subjecting a liquid, hydrocarbonaceous feed in a reaction zone to transient electric arcs produced within said liquid feed, said arcs being generated between inert, electricity-conducting, mobile granules immersed in said liquid feed and loosely positioned in shallow layers on a fixed, electrode grid, the improvement which comprises reducing the pressure in said reaction zone to a subatmospheric pressure of not greater than about 8 pounds per square inch absolute, and carrying out the subjecting of said hydrocarbonaceous feed to said transient arcs at said subatmospheric pressure.

References Cited in the file of this patent

UNITED STATES PATENTS

| | | |
|---|---|---|
| 2,165,820 | Smyers | July 11, 1939 |
| 2,632,731 | Von Ediger | Mar. 24, 1953 |